United States Patent
Wang (10) Patent No.: US 12,425,360 B2
(45) Date of Patent: Sep. 23, 2025

(54) INFORMATION DISPLAY METHOD, ELECTRONIC DEVICE, AND NON-TRANSITORY READABLE STORAGE MEDIUM

(71) Applicant: VIVO MOBILE COMMUNICATION CO., LTD., Dongguan (CN)

(72) Inventor: Cong Wang, Hangzhou (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 18/430,940

(22) Filed: Feb. 2, 2024

(65) Prior Publication Data

US 2024/0171531 A1 May 23, 2024

Related U.S. Application Data

(63) Continuation of application No. PCT/CN2022/109741, filed on Aug. 2, 2022.

(30) Foreign Application Priority Data

Aug. 5, 2021 (CN) .................. 202110897243.X (51) Int. Cl.
| | |
|---|---|
| G06F 15/16 | (2006.01) |
| G06F 40/109 | (2020.01) |
| G06F 40/279 | (2020.01) |
| H04L 51/04 | (2022.01) |
| H04L 51/212 | (2022.01) |

(52) U.S. Cl.
CPC ............ *H04L 51/04* (2013.01); *G06F 40/109* (2020.01); *G06F 40/279* (2020.01); *H04L 51/212* (2022.05)

(58) Field of Classification Search
CPC ..... H04L 51/04; H04L 51/212; H04L 51/224; H04L 51/18; H04L 51/226; H04L 51/043; G06F 40/109; G06F 40/279
See application file for complete search history.

(56) References Cited

U.S. PATENT DOCUMENTS

| | | | |
|---|---|---|---|
| 10,218,668 B1 | 2/2019 | Karp | |
| 10,853,160 B2 * | 12/2020 | Brown | ............... G06F 11/0724 |
| 11,720,612 B2 * | 8/2023 | Harijan | ............... H04L 51/216 |
| | | | 707/725 |
| 2004/0128353 A1 | 7/2004 | Goodman et al. | |
| 2017/0078235 A1 * | 3/2017 | Cannata | ............... H04L 51/224 |

(Continued)

FOREIGN PATENT DOCUMENTS

| | | |
|---|---|---|
| CN | 106330685 A | 1/2017 |
| CN | 106412092 A | 2/2017 |
| CN | 107465807 A | 12/2017 |

(Continued)

*Primary Examiner* — John B Walsh
(74) *Attorney, Agent, or Firm* — The Webb Law Firm (57) ABSTRACT

An information display method includes in a case that a first message displayed in a message interface includes a target keyword, determining a target time based on the target keyword and a first time; and in a case that a time difference between the target time and a second time is greater than or equal to a preset threshold, displaying target information. The first time is a reception time of the first message, the target information is prompt information generated based on the target time, and the second time is a current system time.

12 Claims, 5 Drawing Sheets

(56) References Cited

U.S. PATENT DOCUMENTS

2019/0340048 A1   11/2019   Brown

FOREIGN PATENT DOCUMENTS

| | | |
|---|---|---|
| CN | 107888480 A | 4/2018 |
| CN | 110691334 A | 1/2020 |
| CN | 111917629 A | 11/2020 |
| CN | 112286416 A | 1/2021 |
| CN | 112291419 A | 1/2021 |
| CN | 112437004 A | 3/2021 |
| CN | 113794621 A | 12/2021 |
| WO | 2011019444 A1 | 2/2011 |

* cited by examiner

ID_DISPLAY METHOD, ELECTRONIC DEVICE, AND NON-TRANSITORY READABLE STORAGE MEDIUM

INFORMATION DISPLAY METHOD, ELECTRONIC DEVICE, AND NON-TRANSITORY READABLE STORAGE MEDIUM

CROSS-REFERENCE TO RELATED APPLICATIONS

This application is a Bypass Continuation Application of International Patent Application No. PCT/CN2022/109741, filed Aug. 2, 2022, and claims priority to Chinese Patent Application No. 202110897243.X, filed Aug. 5, 2021, the disclosures of which are hereby incorporated by reference in their entireties.

BACKGROUND OF THE INVENTION

Field of the Invention

This application belongs to the field of communication technologies, and in particular, relates to an information display method and an electronic device and a non-transitory readable storage medium.

Description of Related Art

With the development of electronic technologies, social applications installed in electronic devices play an increasingly important role. Users can communicate through social applications in electronic devices anytime and anywhere. Currently, when communicating through a social application in an electronic device, the electronic device displays a reception time of a chat message when displaying the chat message.

SUMMARY OF THE INVENTION

In a first aspect, embodiments of this application provide an information display method. The method includes: in a case that a first message displayed in a message interface includes a target keyword, determining a target time based on the target keyword and a first time, where the first time is a reception time of the first message; and in a case that a time difference between the target time and a second time is greater than or equal to a preset threshold, displaying target information, where the target information is prompt information generated based on the target time, and the second time is a current system time.

In a second aspect, embodiments of this application provide an information display apparatus. The apparatus includes: a determination module and a display module. The determination module is configured to: in a case that a first message displayed in a message interface includes a target keyword, determine a target time based on the target keyword and a first time, where the first time is a reception time of the first message. The display module is configured to: in a case that a time difference between the target time and a second time is greater than or equal to a preset threshold, display target information, where the target information is prompt information generated based on the target time determined by the determination module, and the second time is a current system time.

In a third aspect, the embodiments of this application provide an electronic device, where the electronic device includes a processor, a memory, and a program or an instruction stored in the memory and executable on the processor, and when the program or the instruction is executed by the processor, the steps of the method according to the first aspect are implemented.

According to a fourth aspect, the embodiments of this application provide a non-transitory readable storage medium. The non-transitory readable storage medium stores a program or an instruction, and when the program or the instruction is executed by a processor, steps of the method according to the first aspect are implemented.

According to a fifth aspect, the embodiments of this application provide a chip. The chip includes a processor and a communications interface, the communications interface is coupled to the processor, and the processor is configured to run a program or an instruction to implement the method according to the first aspect.

In a sixth aspect, the embodiments of this application provide a computer program product. The program product is stored in a non-volatile storage medium. The program product is executed by at least one processor to implement the method described in the first aspect.

DESCRIPTION OF THE INVENTION

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or"

represents at least one of connected objects, and a character "/" generally represents an "or" relationship between associated objects.

With reference to the accompanying drawings, the following describes in detail the information display method in the embodiments of this application based on embodiments and application scenarios.

The information display method provided by the embodiments of this application can be applied in conversation scenarios.

Currently, when displaying a chat message on a chat interface, an electronic device displays a reception time of the chat message in a display area above the chat message, to remind a user of the reception time of the chat message. However, in some cases, a user may overlook or misread a reception time of a message, resulting in misunderstanding when viewing the chat message. For example, message content of message 1 in a chat record of conversation A is: "training is canceled next week", and its reception time is: 01/12 09:30. A user sees message 1 at 01/20 11:50, and when overlooking the reception time of the message, the user mistakenly thinks that message 1 is a newly received message today, and makes an invalid reply to the message.

Take a conversation in a chat APP as an example. When a user views a conversation message of the chat APP, message content of the recently received conversation message displayed in the conversation interface is "attention everyone, training is canceled next Monday". Since the time information "next Monday" in the message does not change with the change of the real time, if the user overlooks the reception time of the message, the content of the message is "training is canceled next Monday" no matter when the user sees the message. If the time at which the user currently views the conversation message has exceeded the time indicated by the message content (that is, next Monday), the user is prone to respond, at the wrong or invalid time, to the event indicated by the conversation message, thus affecting user experience. As a result, the user cannot view messages accurately and poor flexibility in displaying messages.

In the embodiments of this application, when the user views the conversation message of the chat APP, if the message content of the recently received conversation message displayed in the conversation interface is "attention everyone, training is canceled next Monday", according to the reception time of the conversation message and the time in the message content (that is, next Monday), the information display apparatus determines the target time corresponding to the conversation message, and generates target information based on the target time, to remind the user of the valid period of the conversation message, for example, displays information indicating "valid until 01/09" to remind that the conversation message is valid until January 9. In this way, the user can intuitively see the valid period of the event indicated by the message, to avoid that when the current time has exceeded the valid period of the event indicated by the message, an invalid response is made to the event indicated by the message.

Figure 1:
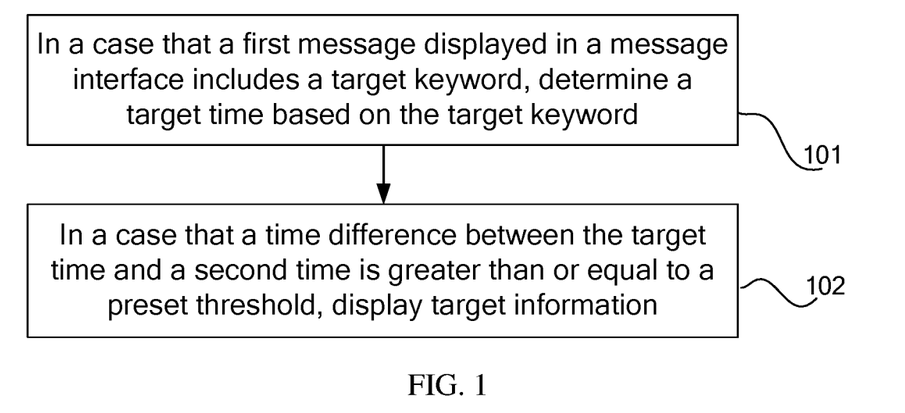
FIG. 1 is a flowchart of an information display method provided by an embodiment of this application.

The embodiments of this application provide an information display method, which can be applied to electronic devices. FIG. 1 is a flowchart of the information display method provided by the embodiments of this application. As shown in FIG. 1, the information display method provided by the embodiments of this application may include the following steps 101 and 102:

Step 101: In a case that a first message displayed in a message interface includes a target keyword, determine a target time based on the target keyword.

The first time is a reception time of the first message.

In the embodiments of this application, the message interface may be a message display interface of a first application. For example, the first application may include any one of the following: conversation applications, shopping applications, office applications, or the like. For example, if the first application is a conversation APP, the message interface may be a conversation interface in the conversation APP.

In the embodiments of this application, the first message may include any one of the following: an instant messaging message, a notification message, or the like. For example, if the first application is a conversation APP, the first message may be a chat record in the conversation APP.

Optionally, in the embodiments of this application, the first message may include any one of the following: messages received by the electronic device within a preset time period, and a preset number of messages displayed on the message interface.

Optionally, in the embodiments of this application, the target keyword is associated with time. That is, the target keyword can be used to indicate a length of time or a moment.

For example, the target keyword may be at least one keyword related to time information in the first message.

For example, the target keyword may be a time-type keyword.

In one example, the target keyword can include specific time in the message including "year", "month", and "day" (such as Jul. 30, 2021) or month and day (such as June 28).

In another example, the target keyword can be a keyword in the message that can characterize a time period (for example, days, weeks, months, or hours), for example, tomorrow, three days, next week, or next month.

In the embodiments of this application, the information display apparatus can determine the target time based on the time information corresponding to the target keyword and the first time.

For example, the time information corresponding to the target keyword may be the time indicated by the target keyword. The time can be a time period or a specific time, such as a specific day.

For example, take the first message as a conversation message. Assuming that the message content of a message A is: "training is canceled next week", the target keyword in the message A is "next week", the time information corresponding to the target keyword can be: 7 days.

For example, the information display apparatus may determine the target time based on the time corresponding to the target keyword and the first time.

For example, the first time may be the time when the electronic device receives the first message, or the time when an electronic device at a message sending end corresponding to the first message sends the first message. The first time may include at least one of the following: year, month, day, week, or the like. For example, the message reception time of a message B may include the specific month, day, and week when the message was received (for example, Thursday, January 2).

Optionally, in the embodiments of this application, the target time is used to indicate the valid period corresponding to the first message. For example, the target time may include at least one of the following: year, month, day, or week. In some cases, the target time may also include other time units, such as hours, minutes, seconds, etc. It can be set flexibly according to actual needs, and the embodiments of this application do not impose any limitations on this.

For example, take the first message as a conversation message. Assuming that the message content of a message C is: "training is cancelled next week", its reception time is: January 2, and the target keyword (that is, next week) in the message C indicates a time period of 7 days, the target time, that is, the valid period of the message C is: January 9, that is, January 2 plus 7 days.

It should be noted that, usually, the time information included in the message is usually to indicate the specific execution time of an event, and the specific execution time can be regarded as the valid date of the message. Based on the above example, the message content of the message C is: "training is canceled next week", and then the time information "next week" is used to indicate the time corresponding to the training cancellation event. If the user sees the message before this time, since the event is an unfinished event at this time, it can be considered that it is still within the valid date of the message, that is, the message is a valid message. If the user sees the message later than this time, because it has already exceeded the execution time of the event, it can be considered that the event has been finished, that is, the message is invalid. Optionally, in the embodiments of this application, the information display apparatus can identify the target keyword associated with time in the first message through semantic analysis, and identify the time information corresponding to the target keyword. For example, if the target keyword in the first message is "next week", the corresponding time information can be 7 days; if the target keyword in the first message is "half a month", the corresponding time information can be 15 days, and if the target keyword in the first message is "one month", the corresponding time information can be 30 days, etc.

It can be understood that the time information corresponding to the target keyword can be determined according to the reception time. For example, when the reception time is January 2021, if the target keyword in the first message is "one month", the corresponding time information can be 28 days. When the reception time is June 2021, if the target keyword in the first message is "one month", the corresponding time information can be 31 days.

Step 102: In a case that a time difference between the target time and a second time is greater than or equal to a preset threshold, display target information.

The target information is prompt information generated based on the target time, and the second time is the current system time.

Optionally, in the embodiments of this application, the target information is: information generated based on the target time, and the target information is used to remind the user of the valid period of the first message.

Optionally, in the embodiments of this application, the current system time (that is, the second time) of the electronic device can be recorded as the current time. The current time may be the system time of the electronic device when the electronic device displays the first message in the message interface.

For example, the current system time of the electronic device can be automatically updated as time changes. The information display apparatus may update the current system time of the electronic device when the display time of the first message exceeds a preset time interval (for example, 15 minutes).

It should be noted that usually in a conversation scenario, the user clicks on a list item corresponding to a conversation to enter the conversation interface (that is, the message interface) of the conversation, and then can view the historical conversation record (that is, the chat record) of the conversation on the conversation interface and a new message received in the conversation. Therefore, the current time can be the current system time of the electronic device when the user enters the message interface corresponding to the first message. Besides, understandably, as time goes by, the current system time of the electronic device also changes. For example, the time when the user enters the message interface of the first message is: 01/02 09:30 (that is, the current system time of the electronic device). If the user continues to view the message interface until 01/02 09:45, the current system time of the electronic device can be updated to 01/02 09:45.

For example, the preset threshold is preset by the system or customized by the user. For example, the preset threshold may be 0 days or 3 days.

In one example, when the first message is displayed in the message interface, the information display apparatus can obtain the current system time, and when it is determined that the current system time exceeds the target time, display the target information corresponding to the first message, to notify the valid period of the first message.

Figure 2:
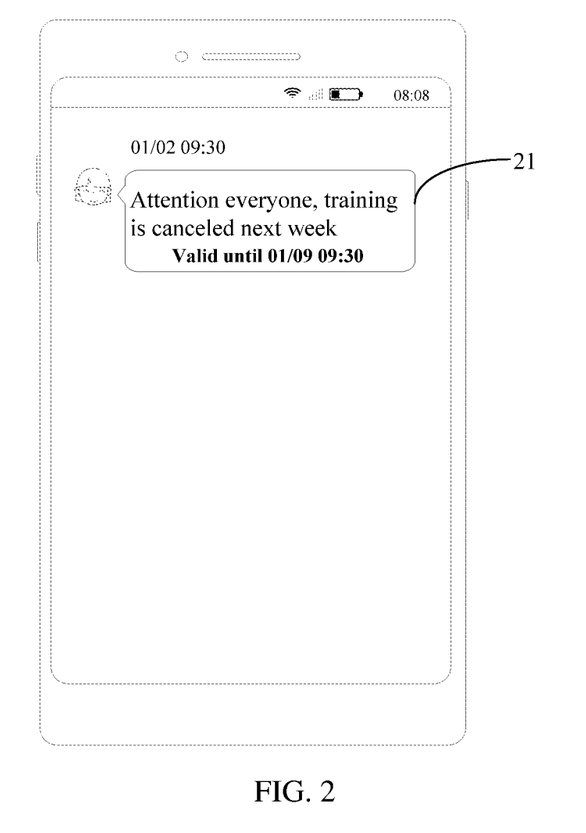
FIG. 2 is a first schematic diagram of an interface applied to an information display method provided by an embodiment of this application.

For example, take the first message as a conversation message. As in the above example, assume that the message content of the message C displayed in the conversation interface is: "attention everyone, training is cancelled next week", its reception time is: January 2, 9:30, and its corresponding target information indicates the target time: January 9 (that is, January 2 plus 7 days). If the system time when the user views the message C is January 20, since the current system time has exceeded the valid time of the message C (the preset threshold set at this time is 0 days), as shown in FIG. 2, "valid until 01/09 09:30" (that is, the target information) is displayed in message box 21 of the message C, to remind the user that the message is invalid.

It can be understood that the target time is earlier than the current system time of the electronic device, which means that the current system time of the electronic device has exceeded the valid period corresponding to the first message, that is, the current time is outside the valid period of the first message. In this case, the user usually does not need to reply to the first message or perform the event indicated by the first message (for example, a message D indicates that an event A needs to be performed on January 2, but the time when the user views the message D is January 3, it is considered that the message D is currently invalid, and the user does not need to reply to it or execute the event A). In order to prevent the user from making an invalid reply or executing the first message, the information display apparatus can display the valid period of the message below the first message (for example, "attention, valid until January 2" is displayed below the message D), to remind users that the message has expired and prevent users from making invalid operations in response to the first message.

Optionally, in the embodiments of this application, the information display apparatus may display the prompt information on a first interface.

Illustratively, the first interface may include any one of the following: a message interface, a notification bar interface, any application interface of the first application that receives the first message, the desktop of the electronic device, etc. The embodiments of this application do not impose any limitations.

In the embodiments of this application, the information content of the target information may include at least one of the following: message content of the first message, the target time, a prompt text, etc.

Optionally, in the embodiments of this application, the information display apparatus may use a preset text template to generate the target information based on the target time and the first message. For example, the preset text template can be: valid until x year x month x day, valid until x month x day x hour x minute, or the message "xxx" is valid until x month x day x hour x minute. It should be noted that "x" can be determined according to the valid periods corresponding to different messages. When the target time in the target information includes the year (that is, "year"), if the current system time and the year included in the message are the same (that is, both are the same year), the "year" may not be displayed. Only time information such as "month" and "day" is displayed.

For example, when the first interface is a message interface for a first message, the target information may be displayed in the same message display box as the first message. The target information can be displayed in a preset area in the message display box. For example, in order to facilitate the user to intuitively see the target information, the target information may be displayed in the display area below the first message in the message display box.

Optionally, in the embodiments of this application, the information display apparatus may display the target information in a preset style in the first interface. For example, the preset style may include at least one of the following: preset color, preset transparency, preset font, preset text size, bold, underline, etc. When the information display apparatus displays the target information, the target information and the first message can be displayed differently through the preset style, so that the user can intuitively see the target information.

Optionally, in the embodiments of this application, the information display apparatus can display the target information in a first control. The first control can be a floating control, that is, the information display apparatus can display the target message in a hover manner on the first interface. After receiving the user's input on the first control, display of the target information can be canceled.

In the information display method provided by the embodiments of this application, in the case that the first message displayed in the message interface includes a target keyword, the information display apparatus can determine the target time based on the target keyword and the first time (the first time is the reception time of the first message); and in the case that the time difference between the target time and the second time (the current system time) is greater than or equal to the preset threshold, display the target information, where the target information is the prompt information generated based on the target time. Through this method, based on the target keyword in the first message and the reception time of the first message, the information display apparatus can determine the target time corresponding to the first message (for example, a valid period of the message), and in the case that the time difference between the target time and the current system time is large, display the target information, to remind the valid period of the first message. In this way, the user can intuitively know the valid period of the message even if overlooking the reception time of the message, and avoid making an invalid reply to the message when the current time exceeds the valid period of the message. Therefore, this improves the accuracy of viewing messages by the user, thereby improving the accuracy and effectiveness of user operations.

Optionally, in the embodiments of this application, after determining the target time based on the target keyword and the first time in the above step 101, the information display method provided by the embodiments of this application further includes the following step B1:

Step B1: in a case that the time difference between the target time and the second time is less than the preset threshold, display the target keyword in the first message in a preset style.

For example, the preset style includes any one of the following: preset transparency, preset color, preset background color (that is, highlight), preset font, preset size, preset dynamic effect (that is, flashing), and add a border. The preset style can also be other styles that can highlight the keyword, and the embodiments of this application does not impose any limitations on this.

Figure 3:
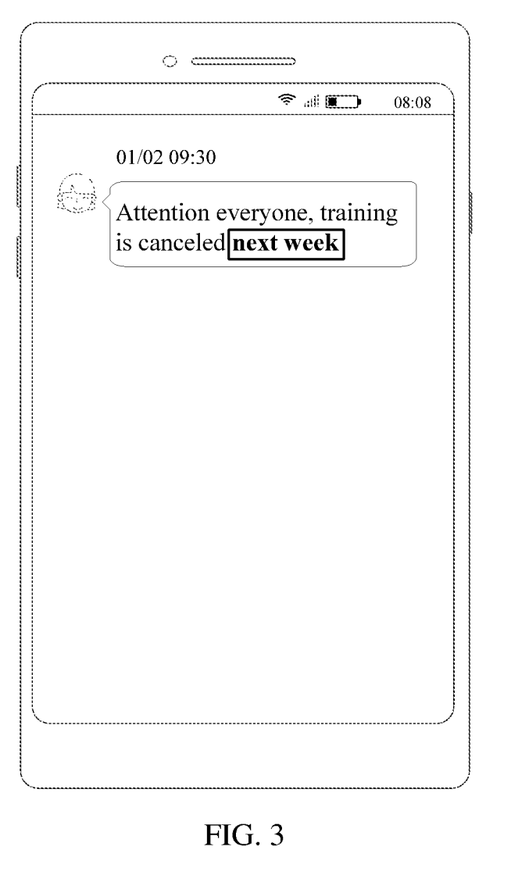
FIG. 3 is a second schematic diagram of an interface applied to an information display method provided by an embodiment of this application.

For example, based on the above example, assume that the message content of the message C is: "attention everyone, training is canceled next week", its reception time is: 9:30 on January 2, and the current time when the user views message C is 13:08 on January 3. It can be determined that the valid period corresponding to the message C is 9:30 on January 9. Since it is currently within the valid period of the message C, as shown in FIG. 3, the words "next week" are added with a frame and highlighted in green, so that when the current time is within the valid period of the message, the target keyword of the event type in the message is highlighted, so that the user can handle the event corresponding to the message in a timely manner.

For example, when the target keyword is displayed in a preset style, the information display apparatus may receive the user's input on the target keyword and cancel the display of the target keyword in the preset style. For example, when "last week" in message C is highlighted in green, the user can cancel the green highlighting effect of "last week" by long-pressing the display area where "last week" is located.

For example, when the time difference between the time corresponding to the target keyword in the first message and the current time is less than a preset time threshold, the information display apparatus may highlight the target keyword, or display the specific time corresponding to the target keyword. For example, if the target keyword in the first message is "the day after tomorrow" and the first message is received on August 3, the specific time corresponding to "the day after tomorrow" can be displayed, that is, August 5.

Optionally, in the embodiments of this application, the message interface also includes a text input box.

Exemplarily, the information display method provided by the embodiments of this application also includes the following steps C1 and C2:

Step C1: Receive a first input performed by a user to enter target text information in the text input box.

Step C2: In response to the first input, in a case that the target text information is associated with the first message, display first prompt information.

The target text information is used to reply to the first message, and the first prompt information is used to indicate that the first message does not meet a preset condition.

For example, the preset condition may be: the time difference between the target time and the second time is less than a preset threshold.

It should be noted that the first message does not satisfy the preset condition, indicating that the time difference between the target time and the current system time is greater than or equal to the preset threshold, that is, the current first message is invalid. Therefore, the information display apparatus can output a prompt message to remind the user that the current reply is based on an invalid message.

For example, the text input box may be a message input box in the message interface, for example, the message input box in the conversation interface.

Illustratively, the first input may include any one of the following: touch input, voice input, gesture input, and other feasible inputs. The embodiments of this application do not impose any limitations on this.

For example, the target text information is associated with the first message, which may be that the target text information and the first message include the same keywords, or keywords with similar meanings.

For example, the content of a message E received by the information display apparatus is: attention everyone, training is canceled next week, and the text content (that is, the target text information) input by the user in the message input box is "why is the training canceled next week?". Since "next week", "training" and "cancel" in the message input box are consistent with the message content of the message E, it can be determined that the text content input by the user is associated with the message E.

For example, the information display apparatus can obtain the target text information in the text input box in real time or periodically, and determine whether the target text information and the first message are related to each other by identifying the semantics of the target text information and the first message.

For example, before displaying the first prompt information, the information display apparatus may generate the first prompt information based on the target text information and the first message. The information display apparatus can display the first prompt information on the first interface when the target time information does not meet the preset condition, to remind the user that the currently entered reply content is based on an invalid message.

Figure 4:
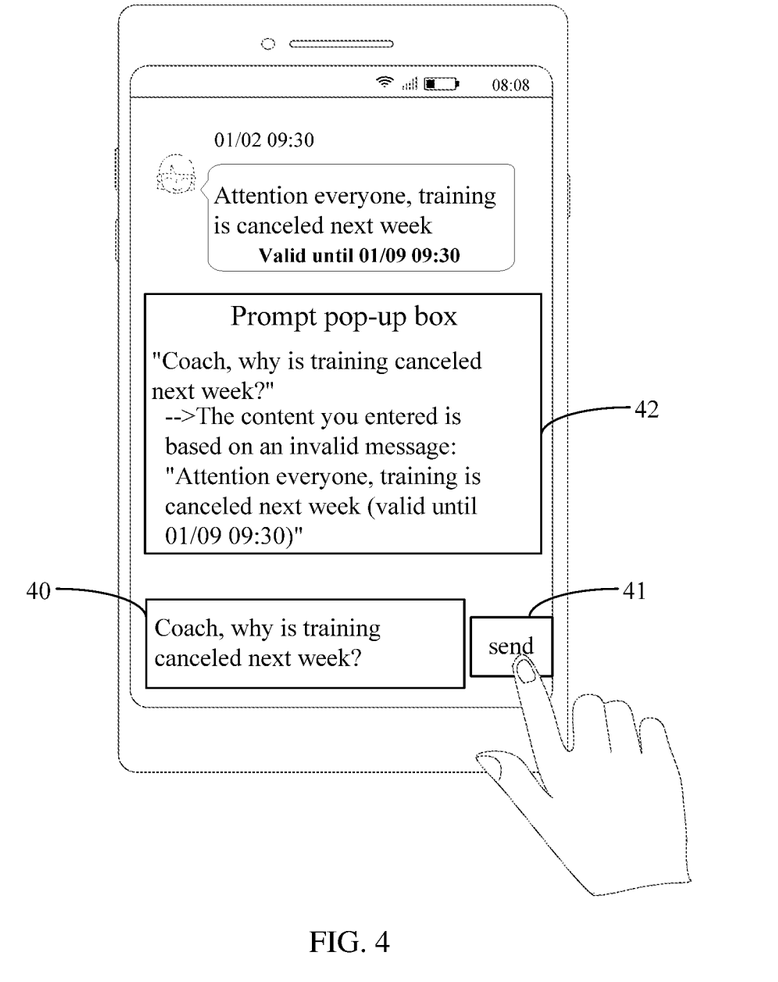
FIG. 4 is a third schematic diagram of an interface applied to an information display method provided by an embodiment of this application.

For example, assume that the message content of message C is: "attention everyone, training is canceled next week", its reception time is: 9:30 on January 2, and the corresponding valid period of message C is 9:30 on January 9. The user currently views message C at 13:08 on January 13. When the user enters the text content "coach, why is training canceled next week" in the message input box 40 and clicks on the button 41 "send", since it is currently outside the valid period of the message C, as shown in FIG. 4, a prompt pop-up box 42 is displayed, and prompt information "the content you entered is based on an invalid message: 'attention everyone, training is canceled next week (valid until 01/09 09:30)'" is displayed in the prompt pop-up box 42, to remind the user that the current reply content is based on the invalid message.

Optionally, the first prompt information also includes a target control after being displayed. For example, the target control may include a button "continue sending" and a button "no longer send" to remind the user to trigger the electronic device to continue sending or no longer send the target text information.

The information display apparatus may receive the user's input on the target control, to send the target text information, or no longer send the target text information.

Figure 5:
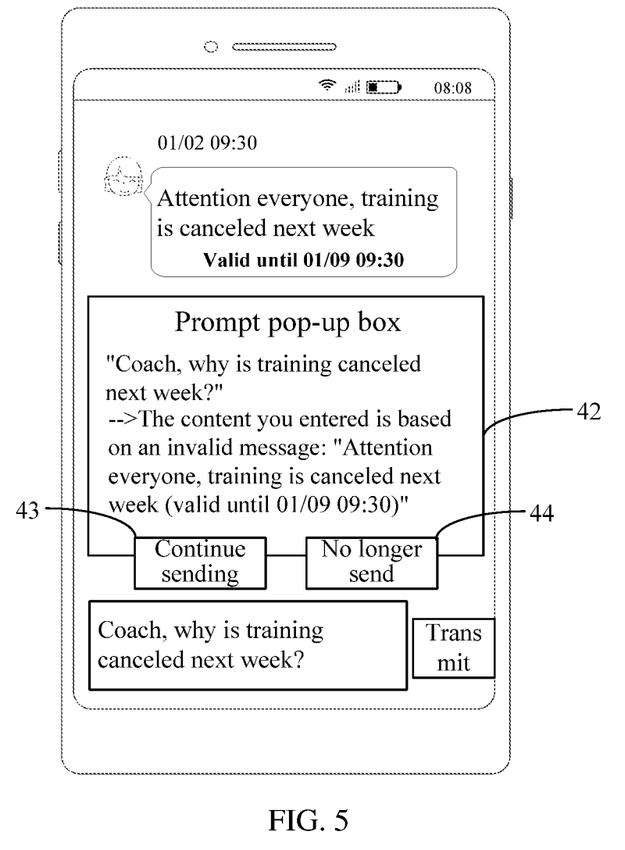
FIG. 5 is a fourth schematic diagram of an interface applied to an information display method provided by an embodiment of this application.

For example, with reference to the FIG. 4, as shown in FIG. 5, the prompt pop-up box 42 includes a button "continue sending" 43 and a button 44 "no longer send". If the user clicks on "continue sending" 43, the information display apparatus continues to send the text content input by the user. If the user clicks on "no longer send" 44, the information display apparatus cancels sending the text content input by the user.

In this way, when the message valid period has expired, and when the user has clicked on the send button to reply to the message, the information display apparatus does not directly send the reply message, and if the reply message is directly sent, the user makes an invalid reply, and instead displays a prompt pop-up window to remind the user that the current reply is for the invalid message, and the user can choose whether to continue to send the input text content for message reply through the prompt pop-up window, which greatly improves the flexibility of user operations.

Optionally, in the embodiments of this application, after the process of displaying the first prompt information in the above step C1, the information display apparatus provided by the embodiments of this application further includes the following step D1:

Step D1: In a case that the target text information is not sent, hide the first message in the message interface.

For example, the first prompt information may include a first control and a second control. The first control may be a "confirm" control, which is used to hide the first message in the message interface, and the second control may be an "overlook" control, which is used to continue to display the first message. Besides, when the user replies to the first message again, the first control and the second control are not displayed in the first prompt message, that is, the user is no longer reminded to hide the first message.

In one example, when the information display apparatus receives the user's input on the first control, the first message can be hidden; when the information display apparatus receives the user's input on the second control, the first message may continue to be displayed.

In another example, when receiving the first input of the user inputting target text information in the text input box, when detecting that the target text information has not been sent within a preset time period, the information display apparatus may automatically hide the first message. The preset time period may be a predetermined time period, for example, 5 minutes.

It should be noted that when the user enters the target text information in the text input box, but does not send the target text information within the preset time period, it can be considered that the user has accepted the prompt information and no longer replies to the invalid first message, and the first message can be hidden.

For example, the information display apparatus may hide the first message in the message interface of the first message, or delete the first message.

For example, when the first message is hidden and the information display apparatus displays the message interface again, the first message will not be displayed in the message interface.

When the user needs to view the first message, the user can search for the first message in the chat record, that is, the hidden first message can be displayed in the interface of the chat record; or the user can restore the hidden first message in the message restoring interface, to re-display the first message in the message interface.

It should be noted that the information display method provided in the embodiments of this application may be executed by an information display apparatus, or a control module in the information display apparatus for executing the information display method. In the embodiments of this application, an example in which the information display method is performed by an information display apparatus is used to describe the information display apparatus provided by the embodiments of this application.

Figure 6:
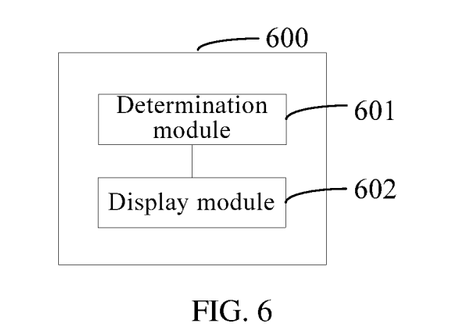
FIG. 6 is a schematic structural diagram of an information display device provided by an embodiment of this application.

Embodiments of this application provide an information display apparatus. As shown in FIG. 6, the information display apparatus 600 includes: a determination module 601 and a display module 602. The determination module 601 is configured to: in a case that a first message displayed in a message interface includes a target keyword, determine a target time based on the target keyword and a first time, where the first time is a reception time of the first message. The display module 602 is configured to: in a case that a time difference between the target time and a second time is greater than or equal to a preset threshold, display target information, where the target information is prompt information generated based on the target time determined by the determination module 601, and the second time is a current system time.

Optionally, in the embodiments of this application, the target keyword is a keyword associated with time.

Optionally, in the embodiments of this application, the display module 602 is further configured to: in a case that the time difference between the target time and the second time is less than the preset threshold, display the target keyword in the first message in a preset style.

Optionally, in the embodiments of this application, the message interface also includes a text input box, and the apparatus also includes: a receiving module 603. The receiving module 603 is configured to receive a first input performed by a user to enter target text information in the text input box. The display module 602 is further configured to: in response to the first input received by the receiving module 603, in a case that the target text information is associated with the first message, display first prompt information. The target text information is used to reply to the first message, and the first prompt information is used to indicate that the first message does not meet a preset condition.

Optionally, in the embodiments of this application, the apparatus further includes: an execution module 604; the execution module 604 is configured to hide the first message in the message interface when the target text information is not sent.

In the information display apparatus provided by the embodiments of this application, in the case that the first message displayed in the message interface includes a target keyword, the information display apparatus can determine the target time based on the target keyword and the first time (the first time is the reception time of the first message); and in the case that the time difference between the target time and the second time (the current system time) is greater than or equal to the preset threshold, display the target information, where the target information is the prompt information generated based on the target time. Through this method, based on the target keyword in the first message and the reception time of the first message, the information display apparatus can determine the target time corresponding to the first message (for example, a valid period of the message), and in the case that the time difference between the target time and the current system time is large, display the target information, to remind the valid period of the first message. In this way, the user can intuitively know the valid period of the message even if overlooking the reception time of the message, and avoid making an invalid reply to the message when the current time exceeds the valid period of the message. Therefore, this improves the accuracy of viewing messages by the user, thereby improving the accuracy and effectiveness of user operations.

The information display apparatus in the embodiments of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not limited in the embodiments of this application.

The information display apparatus in the embodiments of this application may be an apparatus with an operating system. The operating system may be an Android operating system, an iOS operating system, or another possible operating system, which is not limited in the embodiments of this application.

The information display apparatus provided in the embodiments of this application can implement processes in the method embodiments of FIG. 1 to FIG. 5. To avoid repetition, details are not described herein again.

Figure 7:
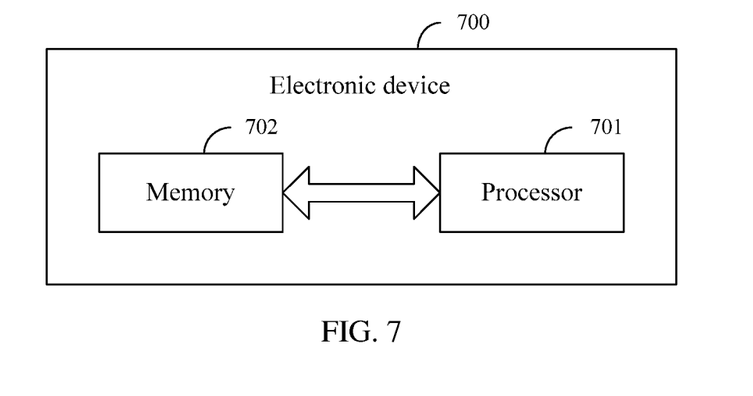
FIG. 7 is a first schematic diagram of a hardware structure of an electronic device according to an embodiment of this application.

Optionally, as shown in FIG. 7, the embodiments of this application also provide an electronic device 700, including a processor 701, a memory 702, and programs or instructions stored in the memory 702 and executable on the processor 701. When the program or instruction is executed by the processor 701, the various processes of embodiments of the foregoing information display method can be achieved, and the same technical effect can be achieved. To avoid repetition, details are not repeated here.

It should be noted that the electronic device in the embodiments of this application includes the foregoing mobile electronic device and the foregoing non-mobile electronic device.

Figure 8:
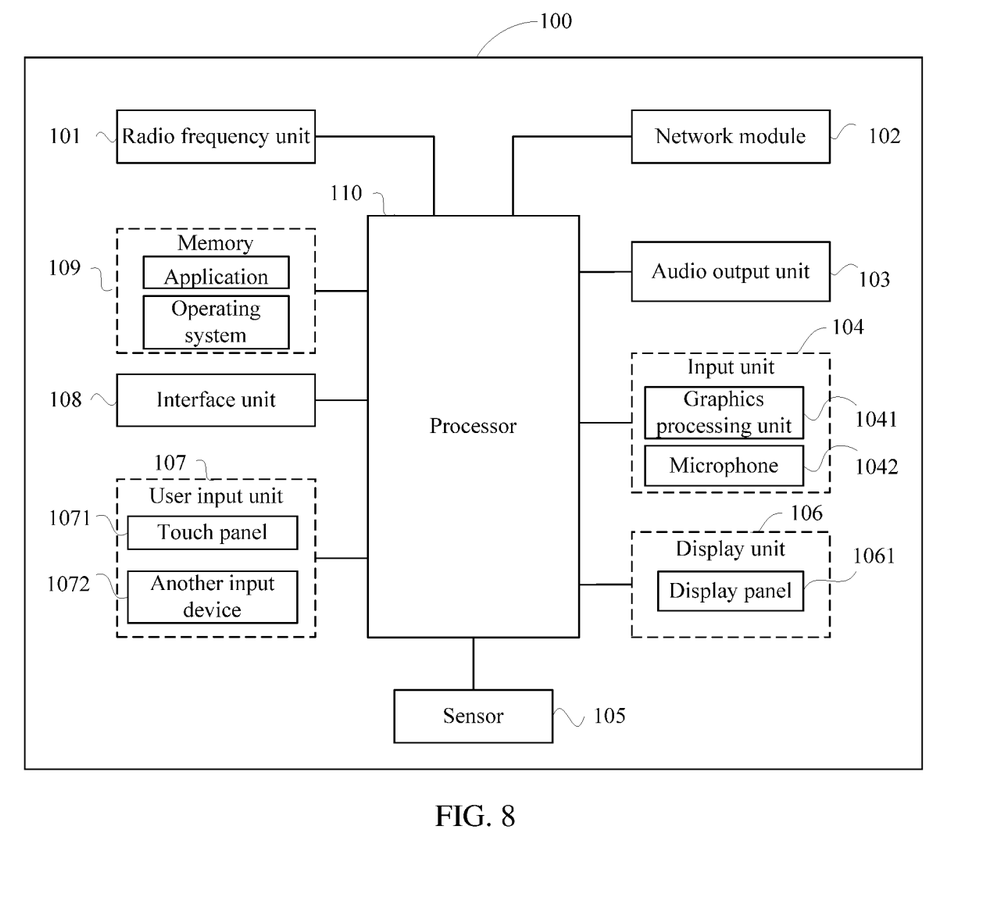
FIG. 8 is a second schematic diagram of a hardware structure of an electronic device according to an embodiment of this application.

FIG. 8 is a schematic diagram of a hardware structure of an electronic device according to an embodiment of this application.

An electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

Those skilled in the art can understand that the electronic device 100 may further include the power supply (for example, a battery) supplying power to each component. The power supply may be logically connected to the processor 110 by using a power management system, so as to implement functions such as charging management, discharging management and power consumption management by using the power management system. The structure of the electronic device shown in FIG. 8 does not constitute any limitation on the electronic device, and the electronic device may include more or fewer components than those shown in the figure, or combine some components, or have different component arrangements. Details are not described herein.

The processor 110 is configured to: in a case that a first message displayed in a message interface includes a target keyword, determine a target time based on the target keyword and a first time, where the first time is a reception time of the first message. The display unit 106 is configured to: in a case that a time difference between the target time and a second time is greater than or equal to a preset threshold, display target information, where the target information is prompt information generated based on the target time determined by the processor 110, and the second time is a current system time.

Optionally, in the embodiments of this application, the target keyword is a keyword associated with time.

Optionally, in the embodiments of this application, the display unit 106 is further configured to: in a case that the time difference between the target time and the second time is less than the preset threshold, display the target keyword in the first message in a preset style.

Optionally, in the embodiments of this application, the message interface also includes a text input box, the user input unit 107 is configured to receive a first input performed by a user to enter target text information in the text input box. The display unit 106 is further configured to: in response to the first input received by the user input unit 107, in a case that the target text information is associated with the first message, display first prompt information. The target text information is used to reply to the first message, and the first prompt information is used to indicate that the first message does not meet a preset condition.

Optionally, in the embodiments of this application, the processor 110 is also configured to hide the first message in the message interface when the target text information is not sent.

In the electronic device provided in the embodiments of this application, in the case that the first message displayed in the message interface includes a target keyword, the information display apparatus can determine the target time based on the target keyword and the first time (the first time is the reception time of the first message); and in the case that the time difference between the target time and the second time (the current system time) is greater than or equal to the preset threshold, display the target information, where the target information is the prompt information generated based on the target time. Through this method, based on the target keyword in the first message and the reception time of the first message, the information display apparatus can determine the target time corresponding to the first message (for example, a valid period of the message), and in the case that the time difference between the target time and the current system time is large, display the target information, to remind the valid period of the first message. In this way, the user can intuitively know the valid period of the message even if overlooking the reception time of the message, and avoid making an invalid reply to the message when the current time exceeds the valid period of the message. Therefore, this improves the accuracy of viewing messages by the user, thereby improving the accuracy and effectiveness of user operations.

It should be understood that, in the embodiments of this application, the input unit 104 may include a graphics processing unit (GPU) 1041 and a microphone 1042. The graphics processing unit 1041 processes image data of a static picture or a video obtained by an image capture apparatus (such as a camera) in a video capture mode or an image capture mode. The display unit 106 may include a display panel 1061, which may be configured in the form of a liquid crystal display, an organic light emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application program and an operating system. An application processor and a modem processor may be integrated into the processor 110, the application processor mainly processes an operating system, a user interface, an application program, and the like, and the modem processor mainly processes wireless communication. It can be understood that, alternatively, the modem processor may not be integrated into the processor 110.

An embodiment of this application further provides a non-transitory readable storage medium. The non-transitory readable storage medium stores a program or an instruction, and when the program or the instruction is executed by a processor, the various processes of the foregoing information display method embodiment is performed and the same technical effects can be achieved. To avoid repetition, details are not described herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, an optical disc, or the like.

An embodiment of this application further provides a chip, the chip includes a processor and a communications interface, the communications interface is coupled to the processor, and the processor is configured to run programs or instructions to implement each process of the embodiments of the foregoing information display method and the same technical effects can be achieved. To avoid repetition, details are not described herein again.

It should be understood that the chip mentioned in this embodiment of this application may also be referred to as a system-level chip, a system chip, a chip system, or an on-chip system chip.

Embodiments of this application provide a computer program product. The program product is stored in a non-volatile storage medium. The program product is executed by at least one processor to implement each process of the above information display method embodiment, and can achieve the same technical effects.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. An information display method, wherein the method comprises:
    in a case that a first message displayed in a message interface comprises a target keyword, determining a target time based on the target keyword and a first time, wherein the first time is a reception time of the first message; and
    in a case that a time difference between the target time and a second time is greater than or equal to a preset threshold, displaying target information, wherein the target information is prompt information generated based on the target time, and the second time is a current system time;
    wherein the message interface further comprises a text input box, and the method further comprises:
    receiving a first input performed by a user to enter target text information in the text input box; and
    in response to the first input, in a case that the target text information is associated with the first message, displaying first prompt information;
    wherein the target text information is used to reply to the first message, the first prompt information is used to indicate that the first message does not meet a preset condition, and that the first message does not meet the preset condition indicates that the first message is an invalid message.

2. The method according to claim 1, wherein the target keyword is associated with time.

3. The method according to claim 1, wherein after the determining the target time based on the target keyword and the first time, the method further comprises:
    in a case that the time difference between the target time and the second time is less than the preset threshold, displaying the target keyword in the first message in a preset style.

4. The method according to claim 1, wherein after the first prompt information is displayed, the method further comprises:
    in a case that the target text information is not sent, hiding the first message in the message interface.

5. An electronic device, comprising a processor, a memory, and a program or an instruction stored in the memory and executable on the processor, wherein the program or the instruction, when executed by the processor, causes the electronic device to perform:
    in a case that a first message displayed in a message interface comprises a target keyword, determining a target time based on the target keyword and a first time, wherein the first time is a reception time of the first message; and
    in a case that a time difference between the target time and a second time is greater than or equal to a preset threshold, displaying target information, wherein the target information is prompt information generated based on the target time, and the second time is a current system time;
    wherein the message interface further comprises a text input box, and the program or the instruction, when executed by the processor, causes the electronic device to further perform:
    receiving a first input performed by a user to enter target text information in the text input box; and
    in response to the first input, in a case that the target text information is associated with the first message, displaying first prompt information;
    wherein the target text information is used to reply to the first message, the first prompt information is used to indicate that the first message does not meet a preset condition, and that the first message does not meet the preset condition indicates that the first message is an invalid message.

6. The electronic device according to claim 5, wherein the target keyword is associated with time.

7. The electronic device according to claim 5, wherein the program or the instruction, when executed by the processor, causes the electronic device to further perform:
    in a case that the time difference between the target time and the second time is less than the preset threshold, displaying the target keyword in the first message in a preset style.

8. The electronic device according to claim 5, wherein the program or the instruction, when executed by the processor, causes the electronic device to further perform:
    in a case that the target text information is not sent, hiding the first message in the message interface.

9. A non-transitory readable storage medium, storing a program or an instruction, wherein the program or instruction, when executed by the processor of an electronic device, causes the electronic device to perform:
    in a case that a first message displayed in a message interface comprises a target keyword, determining a target time based on the target keyword and a first time, wherein the first time is a reception time of the first message; and
    in a case that a time difference between the target time and a second time is greater than or equal to a preset threshold, displaying target information, wherein the target information is prompt information generated based on the target time, and the second time is a current system time;
    wherein the message interface further comprises a text input box, and the program or the instruction, when executed by the processor, causes the electronic device to further perform:
    receiving a first input performed by a user to enter target text information in the text input box; and
    in response to the first input, in a case that the target text information is associated with the first message, displaying first prompt information;
    wherein the target text information is used to reply to the first message, the first prompt information is used to indicate that the first message does not meet a preset condition, and that the first message does not meet the preset condition indicates that the first message is an invalid message.

10. The non-transitory readable storage medium according to claim 9, wherein the target keyword is associated with time.

11. The non-transitory readable storage medium according to claim 9, wherein the program or the instruction, when executed by the processor, causes the electronic device to further perform:
   in a case that the time difference between the target time and the second time is less than the preset threshold, displaying the target keyword in the first message in a preset style.

12. The non-transitory readable storage medium according to claim 9, wherein the program or the instruction, when executed by the processor, causes the electronic device to further perform:
   in a case that the target text information is not sent, hiding the first message in the message interface.

* * * * *